Figure 1:
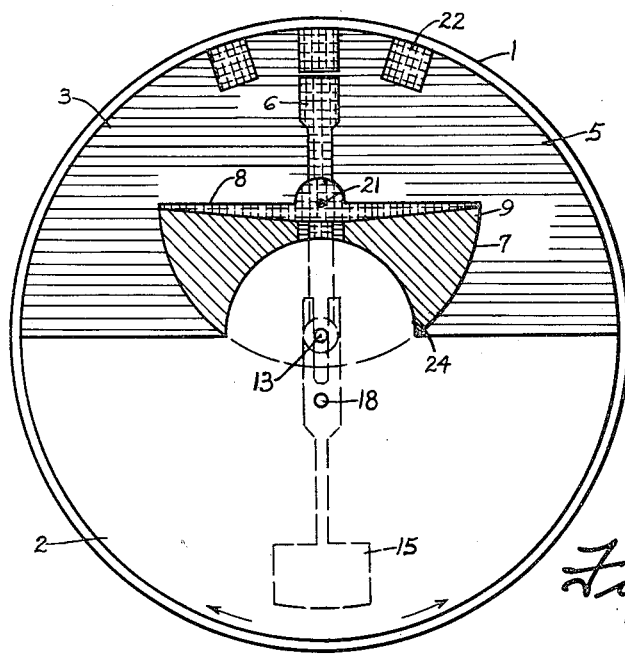

Nov. 13, 1956 R. G. DREVES 2,770,051
BANK AND RATE OF TURN INDICATOR
Filed Oct. 5, 1953 3 Sheets-Sheet 1

INVENTOR
ROBERT G. DREVES
BY
ATTORNEYS

Nov. 13, 1956  R. G. DREVES  2,770,051
BANK AND RATE OF TURN INDICATOR
Filed Oct. 5, 1953  3 Sheets-Sheet 2

INVENTOR
ROBERT G. DREVES
BY
ATTORNEYS

Nov. 13, 1956 R. G. DREVES 2,770,051
BANK AND RATE OF TURN INDICATOR
Filed Oct. 5, 1953 3 Sheets-Sheet 3

INVENTOR
ROBERT G. DREVES
BY
ATTORNEYS

United States Patent Office 2,770,051
Patented Nov. 13, 1956

2,770,051

BANK AND RATE OF TURN INDICATOR

Robert G. Dreves, Williston Park, N. Y.

Application October 5, 1953, Serial No. 384,359

8 Claims. (Cl. 33—204)

(Granted under Title 35, U. S. Code (1952), sec. 266)

The invention described herein may be manufactured and used by or for the Government of the United States of America for governmental purposes without the payment of any royalties thereon or therefor.

The invention relates to an indicator adapted to show the extent of bank and rate of turning movement of a vehicle in a fluid medium, and to show at a glance whether the bank and rate of turn are properly coordinated. Although such an instrument is more adapted for use on airplanes, it is capable of use in any vehicle capable of three dimensional motion, such as submarines.

In making a turn in an airplane, the angle of bank or roll about the longitudinal axis of the craft must vary with the radius of turn of the aircraft about a vertical axis. The smaller the turn radius, the greater must be the angle of bank. In making very tight turns the bank angle may be as high as sixty degrees. It is more customary to use bank angles of fifteen and thirty degrees, however.

The reason for coordinating bank and rate of turn is to avoid skidding and slipping of the airplane. If the wings are not sufficiently banked, the aircraft will skid around a turn. An excessive amount of banking will result in a slipping action or downhill sliding of the airplane and a consequent loss of altitude.

The conventional bank and rate of turn indicator employs a pointer or needle which is pivoted for swinging movement to the right or left of a central vertical position. When the airplane is flying straight, the needle will be in its central position. When a left turn is made, the pointer will swing to the left. The extent of movement depends upon the radius or sharpness of the turn. The smaller the radius, the greater the movement of the rate of turn indicator pointer. The needle will return to its initial central position when the turn ceases. The needle is moved by means of a bar or arm which is actuated by a gyroscope either mounted behind the instrument panel or forming a part of the rate of turn indicator. This movement of the needle arm by the gyroscope is old and well known in the art and forms no part of the present invention.

The bank indicator of the conventional instrument is in the form of a ball mounted to roll in a curved tube or channel, the movement of the ball being dampened by a liquid in the tube. The action is like that of a spirit level. Since the ball is affected by gravity as well as by the centrifugal force of the airplane as it makes a turn, the ball will remain in its central position if bank and rate of turn are properly coordinated to execute a balanced maneuver. It is generally true that there is usually no mechanical connection in conventional bank and rate of turn indicators between the rate of turn indicator mechanism and the ball bank indicator.

One of the objects of the present invention is to provide an easily readable bank and rate of turn indicator.

Another object is to provide an instrument which will show extent of bank alone, rate of turn alone, or bank and rate of turn together.

A further object of the invention is to provide an indicating device whereby a pilot can determine, without looking at the ground or sky, whether he is flying straight or turning, as well as determining if his bank and rate of turn are properly coordinated.

Another object is to provide an indicator which will give the pilot a warning signal when the degree of bank or the rate of turn is excessive.

Another object is to provide an effective instrument which is simple in construction, can be adapted for use with existing rate of turn indicating gyroscopes and is more efficient and effective than most indicators in general use.

Figure 2:
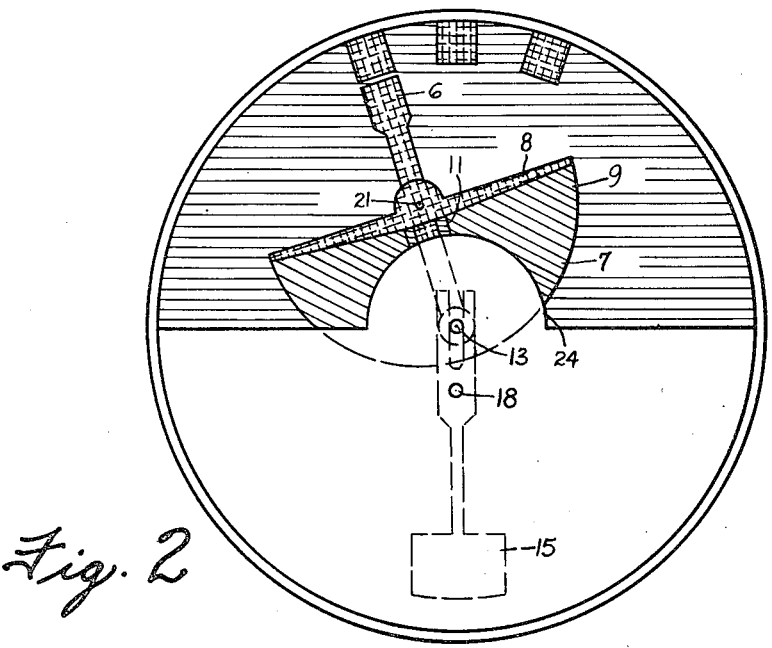
Figure 3:
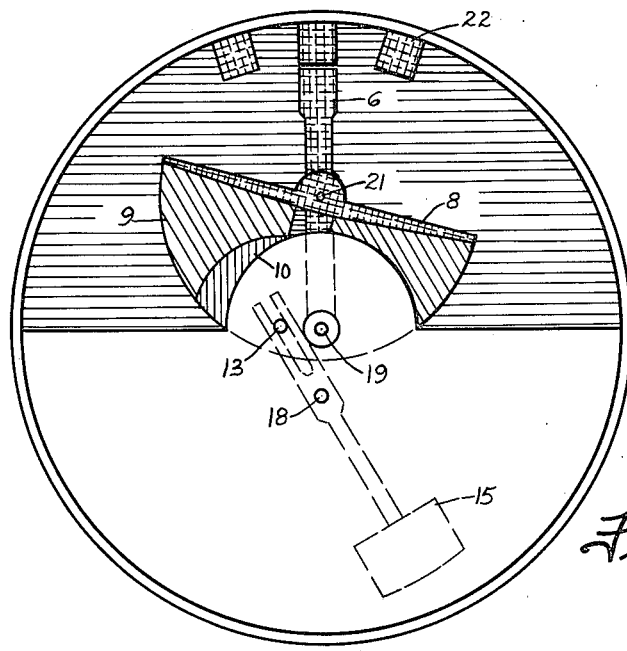
Figure 4:
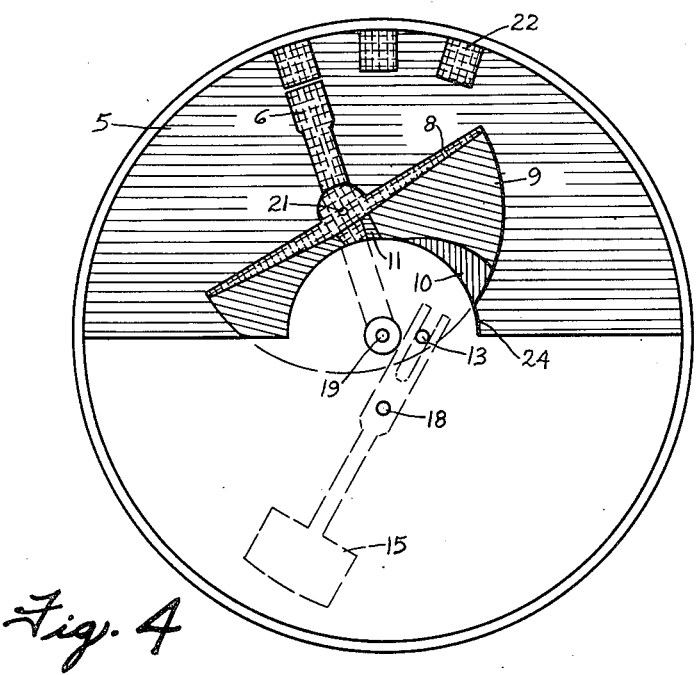
Figure 5:
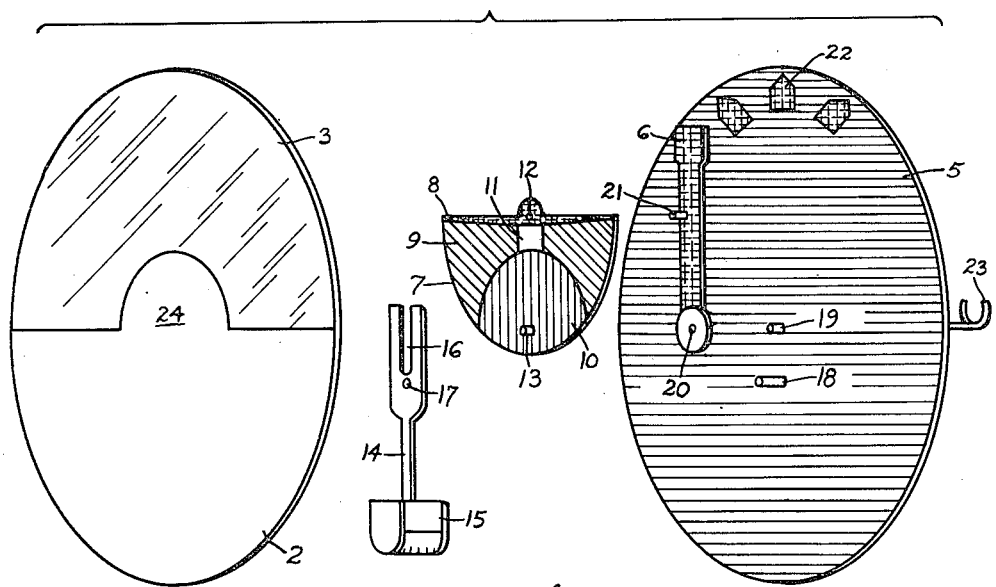
Figure 6:
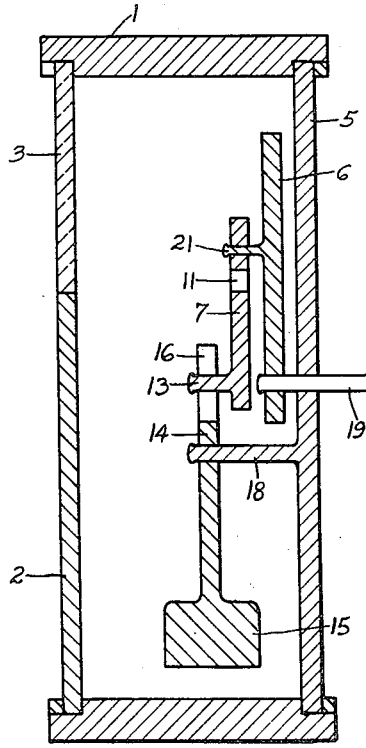

Other objects and many of the attendant advantages of this invention will be readily appreciated as the same becomes better understood by reference to the following detailed description when considered in connection with the accompanying drawings wherein:

Figure 1 is a front view of the indicator showing how it will appear to an airplane pilot or submarine operator when the craft is moving in a straight line and in a horizontal plane, Fig. 2 shows a similar view when the craft is making a properly coordinated left turn, Fig. 3 indicates a condition wherein the aircraft is flying straight but the right wing is low causing the airplane to slip to the right, Fig. 4 represents an indication wherein the airplane is turning to the left but excessive left bank is occurring, causing a left slip, Fig. 5 is an exploded view of the various parts, and Fig. 6 is a vertical cross section of the instrument.

Referring to the drawings, the numeral 1 denotes the instrument case in general. This case may be of any well known configuration, and is usually cylindrical in form. The front or viewing end of the case is provided with a face 2. This face may be of any desired material such as plastic, and is opaque except for the upper portion 3 which is in the form of a transparent window or viewing aperture. Instead of making the window 3 of transparent material, the aperture could be formed by simply cutting an opening in an otherwise opaque disk.

Arranged at the rear of the instrument is a stationary backing or background disk 5. This disk may be of any desired color, but is preferably of a sky blue color to form a background which contrasts readily with other parts of the indicator. Only the upper half of the disk need be colored to show through window 3. Conventional spaced markings or areas 22 appear along the top peripheral face front to align with the indicating pointer or arm 6. These areas are preferably of a light color such as yellow to contrast with the blue background.

The indicating arm 6 is fixed at 20 to a shaft 19 which passes through the center of disk 5 but is not secured to the disk. The shaft is adapted for rotation about its own axis by a claw or prong member 23 which is moved to the right or left by conventional rate of turn gyroscopic mechanism. In this way, the extent of movement of the turn rate gyro will result in a corresponding swinging motion of rate of turn indicator 6, the arm 6 being of the same color as the areas 22.

The disk 5 carries a pivot pin 18 fixed thereupon for pivotally mounting a freely swinging pendulum arm 14 at pivot point 17. Weight 15 at the bottom end of arm 14 is affected by the force of gravity and also by the centrifugal force of the aircraft during turns and rolls. When the airplane is in straight level flight, only the force of gravity will act upon the pendulum, and it will assume the position shown in Fig. 1. If the airplane is banked and the proper rate of turning also occurs to balance the gravity pull against the centrifugal force, then a properly coordinated turn is being executed and the weight 15 will assume the same position relative to the vertical axis of the airplane (see Fig. 2) as it had in Fig. 1.

An additional indicating member 7 in the form of a half disk is mounted at 12 for pivotal or swinging movement about a pin 21 fixed to the arm 6. The lower portion of this member 7 carries a pin 13 adapted to ride in slot or notch 16 in the pendulum arm 14. Since the pin 21 swings about shaft 19 and pin 13 swings about pin 21, the member 7 is capable of movement about either of the two axes 19 or 21 depending upon the position of arm 6.

The front face of the member 7 is divided into several areas as indicated by the numerals 8, 9 and 10. Area 8 is preferably of a light color such as yellow to correspond with that of indicator arm 6 and areas 22. The central part of area 8 coincides with the pivot point 12 and the area is formed in the shape of airplane wings. The reason for this is to more clearly represent or show a banked condition of the airplane. When in level flight the area 8 will appear as in Fig. 1. A left bank will show the left wing low as represented in Figs. 2 and 4. A right bank is indicated in Fig. 3.

Area 9 is made slightly darker than area 8 and of a color to contrast with area 8 and also the background 5. It is found that green works well as a contrasting color. The area is laid out so that the lower curved edge coincides with the arcuate junction between the window 3 and the opaque portion 24 of face 2 in the Fig. 1 and Fig. 2 positions of the indicator.

Area 10 adjoins area 9, is somewhat elliptical in shape, and its upper arcuate edge has a radius corresponding to that of the opaque area 24. This area is of a color which will be very noticeable when it appears, and is preferably of a brilliant color such as red or orange. The area could also be coated with some fluorescent or ultraviolet sensitive material which would attract attention when acted upon by daylight or artificial light from the cockpit or instrument panel. This area 10 is visible only when the airplane is being maneuvered improperly as shown in Figs. 3 and 4. Fig. 3 represents a condition where no turn is occurring but the right wing is lowered to produce a slipping of the aircraft. In Fig. 4 a left turn is occurring but the left wing is lowered an excessive amount, causing a slip to the left. Fig. 2 indicates a proper left turn with the wings in correct position.

As is clear from Fig. 5, the construction permits a clear indication of both rate of turn and bank, yet the parts are so related that the pilot is immediately advised of an excessive amount of bank relative to the rate of turn, and vice versa. This is because the axis of pin 13 coincides with that of shaft 19; and because shaft 19, pin 13, pendulum 14 and rate of turn indicator arm 16 are all in vertical alignment when the aircraft is in normal straight and level flight.

A further indication supplementary to that offered by area 10 is provided by the use of a cut away portion 11 of indicator 7. This cutout may be the same width as arm 6, or slightly wider if desired. When the aircraft is in normal flight, the arm 6 appears through the aperture 6 to provide a pattern shown in Fig. 1. When abnormal maneuvers are made, the movement of member 7 causes the aperture 11 to swing away from arm 6 and expose an increased area of the background 5 through the aperture. These conditions are illustrated in Figs. 3 and 4. This additional indication may be dispensed with if desired simply by making the member 7 solid and coloring the area green.

Although certain colors have been suggested as being considered most practical for ordinary conditions, the invention is not limited to these specific colors. The chief objective is to obtain the most effective contrast and satisfactory indication under any specific condition. For instance, some colors may be more adaptable to daylight than others. Under artificial illumination with plain or colored incandescent lamps, fluorescent lamps or ultraviolet lighting, it may be found that the colors most useful under daylight conditions are not the best. A certain amount of latitude or variation would be obvious to anyone using this form of indicator.

Obviously many modifications and variations of the present invention are possible in the light of the above teachings. It is therefore to be understood that within the scope of the appended claims the invention may be practiced otherwise than as specifically described.

What is claimed is:

1. A bank and rate of turn indicator comprising a colored backing member carrying rate of turn indicating markings of a different color, a rate of turn indicating arm of the same color as the markings rotatable relative to said member to align with various ones of the markings, a bank indicator pivotally connected to said arm, a pendulum pivotally mounted on said backing member and having a pin and slot connection with the bank indicator, a front face spaced from said backing member and forming the front of the indicator assembly, the face having a transparent opening for displaying the rate of turn arm and the bank indiactor and an opaque portion with an arcuate edge adjacent the transparent opening; said bank indicator having a first area visible at all times through said opening and resembling the configuration of airplane wings of the same color as the rate of turn indicating markings, a second area of a contrasting color visible at all times through said opening, and a third area with a high contrast surface lying behind said opaque face portion when no bank or turn is occurring.

2. An indicator as set forth in claim 1 wherein the lower half of said face portion is opaque.

3. An indicator as set forth in claim 1 wherein the juncture of said second and third areas coincides with the arcuate edge of said opaque portion.

4. An indicator as set forth in claim 2 wherein the second area is divided into two sections by means of an opening in the bank indicator.

5. An indicator of the character described comprising a pivoted rate of turn indicating arm, a substantially semicircular bank indicating member pivoted at its upper end to said arm and having at least two distinct and differently designated areas, a front face having a transparent portion for exposing the rate of turn indicating arm and the bank indicating member and an opaque portion of the same configuration as one of the designated areas to hide this area from view when the rate of turn indicating arm and the bank indicating member are in normal flight indicating positions.

6. An indicating member for a bank and rate of turn indicator, said member being substantially semicircular in configuration and apertured substantially midway along its straight edge for pivotal mounting thereof and being cut away below said aperture to expose an area behind the member, the member having three distinct and differently designated areas on its front face, one area being shaped to represent the wings of an airplane and another being substantially semicircular in configuration.

7. An indicator of the type described comprising a backing member, a rate of turn indicating arm movable in front of the member, a substantially semi-circular bank indicating element connected to said arm for movement therewith and in front of the arm, said bank indicating element having a contrastingly marked generally elliptically shaped area thereof smaller than the whole indicating surface thereof, a pendulum pivoted for swinging movement relative to said backing member, said pendulum being connected to said bank element for movement thereof relative to said arm, a front face spaced from said backing member and in front of said indicators, said face having an upper transparent window portion through which the rate of turn arm and bank elements are always visible, and a central arcuate opaque portion, the axis of the arcuate edge of said opaque portion being in line with the axis of movement of said arm, said pendulum extending behind said opaque portion, and said elliptical area being hidden by the arcuate opaque portion when the rate of turn and bank are properly coordinated but appearing through the window when the coordination is improper.

8. An indicator as set forth in claim 7 wherein a portion of the bank element is cut away to form an aperture, the aperture aligning with the rate of turn arm when rate of turn and bank are properly coordinated and exposing therethrough an area of the backing member when the coordination is improper.

References Cited in the file of this patent

UNITED STATES PATENTS

| | | |
|---|---|---|
| 2,504,114 | De Martino | Apr. 18, 1950 |

FOREIGN PATENTS

| | | |
|---|---|---|
| 791,315 | France | Sept. 23, 1935 |
| 489,232 | Great Britain | July 21, 1938 |